United States Patent [19]

Suay Balaguer

[11] 3,990,685
[45] Nov. 9, 1976

[54] KNEADING APPARATUS FOR BREADMAKING

[76] Inventor: Enrique Suay Balaguer, Industria 10 & 12, Valencia, Spain

[22] Filed: Feb. 21, 1975

[21] Appl. No.: 551,997

[30] Foreign Application Priority Data
Aug. 14, 1974 Spain .................................. 205286

[52] U.S. Cl. .................................... 259/185; 259/2
[51] Int. Cl.[2] .......................................... B29B 1/04
[58] Field of Search .................... 259/185, 186, 2; 198/185, 230, 29, 30, 283

[56] References Cited
UNITED STATES PATENTS

| | | | |
|---|---|---|---|
| 1,729,671 | 10/1929 | Bell-Irving | 198/185 |
| 2,047,106 | 7/1936 | Lidberg | 198/185 |
| 2,649,187 | 8/1953 | Eggleston | 198/185 |
| 2,806,578 | 9/1957 | Jones | 198/185 |

*Primary Examiner*—Robert W. Jenkins
*Attorney, Agent, or Firm*—Wenderoth, Lind & Ponack

[57] ABSTRACT

An improved kneading apparatus for breadmaking includes a horizontal endless conveyor belt, over a portion only of the surface of which transversely extends a second inclined belt forming a dihedral angle with the first belt. One of the ends of the chassis of the second belt is articulated around a vertical shaft supported by a cross-member over the first conveyor belt, while the opposite end of the chassis of the second belt comprises anchoring means variable through a curved slot in a second cross-member. Varying of the anchoring position makes it possible to obtain different transverse incidence inclinations between the two belts.

3 Claims, 2 Drawing Figures

KNEADING APPARATUS FOR BREADMAKING

BACKGROUND OF THE INVENTION

This invention relates to a dough kneading apparatus for breadmaking which kneads and shapes portions of dough, the dough being given a predominantly spherical shape.

The dough kneader is of the type which is functionally located next to a dough proportioning or batching device.

SUMMARY OF THE INVENTION

Structurally, the kneader of the invention includes a pair of endless belts which are permanently in motion and which are positioned so as to form an acute dihedral angle.

One of the belts is horizontal, while the second belt is located above the first belt in an inclined position with respect to the horizontal plane and at the same time is diagonally oriented with respect to the horizontal belt.

Hereinafter, the belt located horizontally will be referred to as the main belt, and the inclined belt will be called the auxiliary belt.

The directions of movement for the two belts are opposite, and due to this the portions of unformed dough which are deposited on the main belt, when displaced, are moved into contact with the auxiliary belt. A friction or rubbing action is then produced over the unformed dough portions by both belts in such a manner that the dough portion is shaped into a sphere.

Logically, the portion of unformed dough is deposited on the main belt at the region thereof closest to the auxiliary belt, and in this way the dough is subjected to friction along the entire length of the auxiliary belt at the same time as the dough itself is conveyed towards the delivery or discharge end of the main belt.

DETAILED DESCRIPTION OF THE INVENTION

Figure 1:
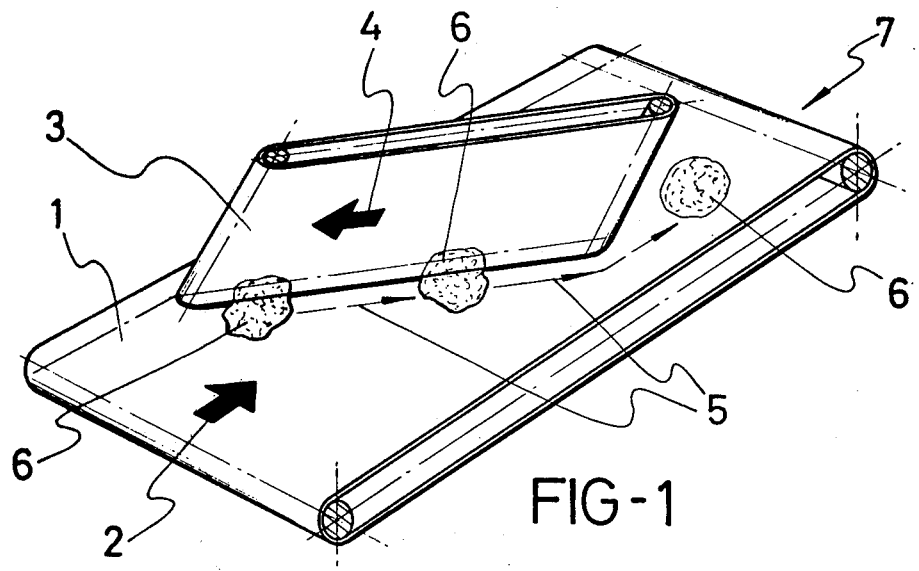
FIG. 1 of the attached drawings shows a schematic perspective view of a kneading apparatus according to the present invention.

In the drawings, the main belt 1 is driven in a conventional manner by drive 20 in the direction indicated by arrow 2. The auxiliary belt 3 is driven in a conventional manner by drive 21 in the direction indicated by arrow 4.

Belt 3 is mounted to form an acute dihedral angle A with belt 1, and additionally belt 3 extends diagonally across the upper surface of belt 1 at an angle B which may be adjusted, as described in more detail below. Further, belt 3 is positioned to extend only over a portion of the width of the upper surface of belt 1, thereby maintaining a channel space 22 of sufficient size to allow passage of rounded dough portion 6'.

Unformed dough portion 6 is delivered to belt 1 and as it continues along the path indicated by arrow 5, it acquires the shape of a sphere until, as rounded dough portion 6, it finally reaches end 7 of belt 1, where it leaves the kneading apparatus to be subjected, for example, to a subsequent cooking process.

Figure 2:
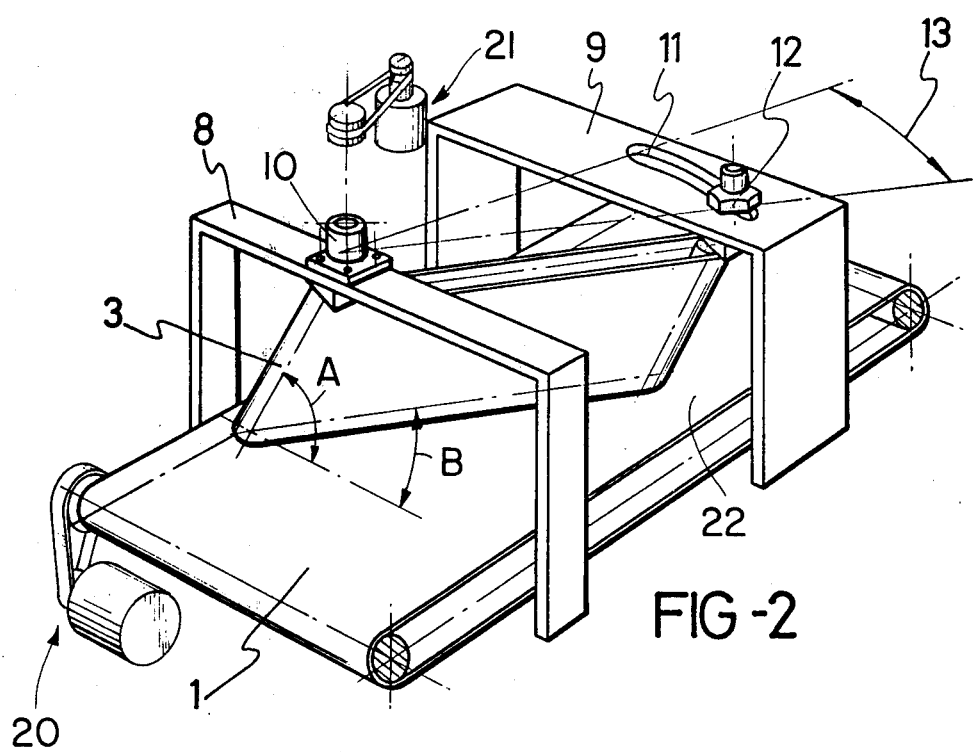
FIG. 2 is a view similar to FIG. 1, but showing supporting and drive structure for the kneading apparatus.

FIG. 2 illustrates a pair of U-shaped cross supporting elements 8 and 9 which support auxiliary belt 3. Thus, one of the rollers of belt 3 is connected by the shaft thereof to bush 10 which is attached to cross-member 8.

The other roller of auxiliary belt 3 is prolonged into a threaded stud 12 which passes through a curved slot 11, which is an arc 13 of a circle having a center at 10, in cross-member 9, which stud can be inserted at any point along slot 11, the stud 12 being held in such position by means of a corresponding nut. In this way, different diagonal positions of belt 3, i.e. adjustment of angle B, with respect to belt 1 may be achieved.

I claim:

1. A breadmaking kneading apparatus for forming unformed dough portions into rounded dough portions, said apparatus comprising:
    a substantially horizontal first endless conveyor belt;
    means for driving said first belt;
    a second endless conveyor belt;
    means mounting said second belt over said first belt at an acute dihedral angle with the upper surface thereof and extending diagonally over a first portion only of the width thereof; and
    means for driving said second belt in a direction opposite to that of said first belt.

2. An apparatus as claimed in claim 1, wherein said second belt does not extend over a second portion of the width of said first belt, said second portion being of a width to allow passage thereover of rounded dough portions without being diverted off said first belt.

3. An apparatus as claimed in claim 1, wherein said mounting means includes means for selectively moving said second belt to a plurality of different fixed diagonal positions across the width of said first belt.

* * * * *